3,544,542
PROCESS FOR ISOLATING CIS-1,4-POLYISOPRENE FROM HYDROCARBON SOLUTIONS
Josef Witte, Cologne-Stammheim, Gottfried Pampus, Leverkusen, Friedrich Haas, Cologne-Buchheim, and Nikolaus Schön and Egon Kuntz, Leverkusen, Germany, assignors to Farbenfabriken Bayer Aktiengesellschaft, Leverkusen, Germany, a corporation of Germany
No Drawing. Filed Nov. 26, 1968, Ser. No. 779,210
Claims priority, application Germany, Dec. 21, 1967, 1,720,763
Int. Cl. C08d 5/00; C08f 1/92, 27/00
U.S. Cl. 260—94.7                                    4 Claims

ABSTRACT OF THE DISCLOSURE

Improved process for isolating cis-1,4-polyisoprene from its solution in organic solvents wherein the catalyst is deactivated by means of a primary or secondary aliphatic diamine or polyamine, optionally in combination with a lower aliphatic alcohol and/or a secondary aliphatic or cycloaliphatic monoamine.

---

It is known that isoprene can be polymerised by means of organometallic mixed catalysts of the Ziegler type to give a product with a structure resembling that of natural rubber and having predominantly cis-1,4-linkages. Vulcanisates of these polyisoprenes differ from corresponding natural rubber vulcanisates, however, so far as their properties in critical fields of application are concerned. Natural rubber is superior to commercial cis-1,4-polyisoprene in its degree of crosslinking and network structure, as reflected in both the tensile strength and structural strength of the vulcanisates, quite apart from their higher strain values. This applies, in particular, to vulcanisates which contain no or small amounts of fillers, especially weak fillers, such as MT-carbon blacks, and is less pronounced, but nevertheless still recognisable, in HAF- and ISAF-carbon black mixtures of tread quality for vehicle tires.

The polymerisation of isoprene with organometallic mixed catalysts, for example $Al(iso-C_4H_9)_3/TiCl_4$, is usually carried out in solution in solvents, for example aliphatic or aromatic hydrocarbons, such as pentane, hexane, cyclohexane, benzene or toluene. An example for this type of polymerisation is as follows: The polymerisation catalyst is added to an 8–30% by weight solution of isoprene in the absence of oxygen and moisture. For example, mixtures of aluminum trialkyls, optionally in admixture with their etherates and titanium tetrachloride, are used as the catalysts. Polymerisation may be carried out at temperatures of from −20 to +80° C. After the required monomer conversion, for example 90% or more, has been reached, the catalyst is inactivated by the addition of suitable substances, for example alcohols such as methanol or ethanol. Following the addition of suitable stabilisers, for example 2,6-di-tert.-butyl-4-methylphenol; 2.2'-dihydroxy-3,3'-di-tert.-butyl-5,5' - dimethyl diphenyl methane; or phenyl-β-naphthylamine, the polymer can be isolated from the solution by the addition of a precipitant, for example ethanol or acetone. On a commercial scale, polyisoprene is recovered from the hydrocarbon solution (stripping). The rubber, which is isolated in the form of crumbs, is dried in a vacuum cabinet ether on a belt conveyor or by means of a screw.

The isolation of cis-1,4-polyisoprene from solution in hydrocarbons by steam distillation (stripping) is accompanied by greater degradation of the polymer than is observed on precipitation with ethanol. This is reflected in a slight reduction in the Mooney viscosty (ML–4'/100° C.,) and to a greater extent in marked reduction in the Defo hardness. It is not possible to prevent this degradation by increasing the concentration of the stabiliser. However, it is undesirable that there should be any degradation in the recovery stage, because further processing of the cis-1,4-polyisoprene, for example compounding on mixing rollers or in internal mixers, is inevitably accompanied by further degradation.

In compounding cis-1,4-polyisoprene a molecular weight as high as possible, i.e. very high Mooney and Defo values, is desirable because distribution of the filters and vulcanisation auxiliaries is better and considerably more uniform. This is caused by a higher shear gradient in the high molecular weight polymers. Better distribution of the fillers results accordingly in improved vulcanisates.

The present invention relates to an improved process for isolating cis-1,4-polyisoprene from catalyst-containing solutions thereof in organic solvents by deactivating the catalyst followed by steam distillation, optionally in the presence of a stabiliser, which comprises deactivating the catalyst by adding a primary or secondary aliphatic diamine or polyamine to the cis-1,4-polyisoprene solution in a quantity of from 0.02 to 1.00% by weight, based on solid rubber, optionally in admixture with a lower aliphatic alcohol in a quantity, of from 0 to 5% by weight and/or a secondary aliphatic or cycloaliphatic monoamine containing at least 10 carbon atoms, in a quantity of from 0 to 0.8% by weight, based on solid rubber. The deactivating agents may be added, either separately or in admixture, in solution in a hydrocarbon, preferably in the polymerisation medium.

Primary or secondary diamines and polyamines suitable for use in the process according to the invention include in particular di- or polyalkyl amines, preferably those wherein the alkyl moities contnain up to 6 carbon atoms, for example 1,2-diamino ethane; 1,2-di-(methylamino)-ethane; bis-(2-aminoethyl)-amine; 1,11-diamino-3,6,9-triazo-undecane; 1,3-diaminopropane; bis(3-aminopropyl)-amine; and methyl-bis-(3-aminopropyl)-amine.

Di- or polyalkyl amines (for example with from 3 to 5 amino groups) in which the amino groups are separated by 2 or 3 methylene groups, may also be used with advantage in the process according to the invention. It is also possible, however, to use amines with longer alkyl chains, for example, with $C_4$-$C_{10}$ chains, such as hexamethylene diamine, or tetramethylene diamine.

Although the secondary monoamines, which may optionally be used, do not on their own show any activity during working-up by distillation with steam, they nevertheless intensify the effect of the primary or secondary diamines of polyamines, and improve the properties of the vulcanisate obtained from the crude rubber. They are used in quantities of up to 0.8% by weight, based on solid rubber, and preferably in quantities of at least 0.05% by weight.

Suitable amines include, in particular, aliphatic or cycloaliphatic amines containing one fairly long chain and one shorter alkyl or cycloalkyl radcal. Derivatives of methylamine in which one of the hydrogen atoms is replaced by a linear or branched alkyl radical with from 9 to 24 carbon atoms, are particularly preferred. Di-2-ethylhexylamine, dicyclohexylamine, and N-stearlymethyl-amine are examples of suitable amines. The amine is preferably used in a quantity of from 0.2 to 0.7% by weight, based on solid rubber.

The di- or polyamines are used in quantities of from 0.02 to 1.0% by weight, and preferably in quantities of from 0.05 to 0.5% by weight, based on solid rubber.

Methanol, ethanol or isopropanol may, for example, be used as the lower aliphatic alcohols, in quantities of up to 5% by weight, and preferably, in quantities of at least 0.05% by weight, based on solid rubber.

The amines or the mixture of the two amines may be diluted with a hydrocarbon, preferably the hydrocarbon used as polymerisation medium, so that a homogeneous solution is obtained. The alcohols are used in particular if difficulties are involved in dissolving the amines.

Working-up itself, i.e. steam distillation, may be carried out in the usual way, following the addition of the deactivator mixture used according to the invention. As a rule, conventional stabilisers and anti-agers are added, for example phenols or aromatic amines, such as 2,6-di-tert.-butyl-4-methyl phenol; 2,2'-dihydroxy-3,3'-di-tert.-butyl-5,5'-dimethyl diphenyl methane or phenyl-$\beta$-naphthylamine, in quantities of from 0.1 to 2% by weight.

EXAMPLES

Polymerisation 2 kg. of isoprene were polymerised up to a conversion rate of 93% in 10% by weight solution in n-hexane in the presence of an organometallic mixed catalyst comprising $TiCl_4$ and $Al(C_2H_5)_3$.

Working-up

A mixture of 10% by weight of n-hexane, 2.5% by weight of ethanol and 1% by weight of 2,6-di-tert.-butyl-4-methylphenol (based on polyisoprene), was added to this polymerisation mixture (conversion 93%=9.3% solids content) at 20° C. to deactivate the catalyst and for the purpose of stabilisation.

A mixture of a di- or polyfunctional amine and 2.5% by weight of ethanol in solution in 10% by weight of hexane (based on solid rubber) was added to other completely identical polymerisation mixtures, which were then stabilised with 1% by weight of 2,6-di-tert.-butyl-4-methylphenol. The amines were used in amounts providing equivalent quantities of amino nitrogen.

The polyisoprene solutions were divided, the solid rubber being isolated from the resulting solutions by precipitation with alcohol and by distillation with steam. The rubber was dried in vacuo at 50° C.

Table 1 shows the solution viscosity, Mooney and Defo values of the polyisoprenes isolated by precipitation with alcohol and distillation with steam, in dependence upon the type of amine used and the quantity in which it is used.

A=working-up by precipitation with ethanol.
B=working-up by steam distillation.

TABLE 1

| Amine | | Quantity, percent by weight | ML-4' 100° C. | Defo H/E, 80° C. | Solution viscosity in toluene at 25° C. ($\eta$) |
|---|---|---|---|---|---|
| Example: | | | | | |
| 1 | Comparison test | | A—93 | 2,050/25 | 5.13 |
| | | | B—88 | 1,000/22 | 4.56 |
| 2 | 1,2-diaminoethane | 0.085 | A—98 | 1,700/30 | 5.14 |
| | | | B—96 | 1,800/26 | 5.37 |
| 3 | Bis-(2-aminoethyl)-amine | 0.05 | A—100 | 1,550/30 | 4.60 |
| | | | B—98 | 1,600/33 | 4.42 |
| 4 | do | 0.1 | A—104 | 1,900/36 | 5.57 |
| | | | B—104 | 2,000/31 | 5.48 |
| 5 | 1,11-diamino-3,6,9-triazaundecane | 0.1 | A—90 | 2,200/33 | 6.14 |
| | | | B—90 | 2,150/32 | 6.15 |
| 6 | 1,6-diaminohexane | 0.23 | A—91 | 1,750/25 | 4.60 |
| | | | B—98 | 1,850/34 | 5.30 |
| 7 | 1,4-diaminobutane | 0.13 | A—94 | 1,900/25 | 5.60 |
| | | | B—93 | 1,700/34 | 5.70 |

From 0.05 to 0.8% by weight of a secondary amine whose organic radicals contain at least 10 carbon atoms may also be added to the deactivator solution in order to improve the stability of the vulcanisate. This does not in any way affect the stabilisation, according to the invention, of cis-1,4-polyisoprene against degradation during working-up by steam distillation. The secondary amine on its own is unable to prevent degradation during work-up, as shown in Table 2 with reference to the example of methyl stearylamine.

TABLE 2

| Amine | | Quantity, percent by weight | ML-4'/ 100° C. | Defo H/E, 80° C. | Solution viscosity in toluene at 25° C. $\eta$ |
|---|---|---|---|---|---|
| Example: | | | | | |
| 7 | Methylstearylamine | 0.5 | A—95 | 2,050/25 | 5.13 |
| | | | B—86 | 1,000/22 | 4.56 |
| 8 | Bis-(2-aminoethyl)-amine | 0.1 | A—104 | 1,900/36 | 5.57 |
| | | | B—104 | 2,000/31 | 5.48 |
| 9 | Bis-(2-aminoethyl)-amine + methylstearylamine | 0.1, 0.5 | A—94 | 1,950/37 | 5.58 |
| | | | B—94 | 1,950/37 | 5.88 |

The process described in this specification not only prevents the degradation of cis-1,4-polyisoprene during its isolation from hydrocarbon solutions by distillation with steam, but also improves the stability of the polymers in storage.

The data set out in Table 3 shows that, even after storage for 90 days at room temperature (25° C.), the polymers worked-up in accordance with the invention do not show any reduction in their Mooney and Defo values. (Nos. 2, 3 and 7).

TABLE 3

| Example No. | Deactivator | Percent by weight | Stabilizer | Percent by weight | ML-4'/ 100° C. | Defo H/E 80° C. | Working-up | Storage at room temperature, days |
|---|---|---|---|---|---|---|---|---|
| 10 | Ethanol | 2.5 | 2,6-di-tert.-butyl-4-methyl phenol. | 1.0 | 93 / 86 / 77 | 2,050/25 / 1,000/22 / 800/14 | Ethanol precip., steam-distillation. | 5 / 5 / 90 |
| 11 | Bis-(2-aminoethyl)-amine. / Ethanol | 0.1 / 2.5 | do | 1.0 | 100 / 100 / 102 | 2,150/35 / 2,150/38 / 2,100/35 | do | 5 / 5 / 90 |
| 12 | Bis-(2-aminoethyl)-amine. / Methylstearylamine / Ethanol | 1.0 / 0.5 / 2.5 | do | 1.0 | 103 / 100 / 100 | 2,100/30 / 2,150/30 / 2,000/32 | do | 5 / 5 / 90 |
| 13 | Methylstearylamine / Ethanol | 0.5 / 2.5 | do | 1.0 | 100 / 91 / 88 | 1,900/30 / 1,450/23 / 1,175/27 | do | 5 / 5 / 90 |
| 14 | Ethanol | 2.5 | 2,2'-dihydroxy-3,3'-di-tert.-butyl-5,5'-dimethyl diphenyl methane. | 0.5 | 101 / 92 / 78 | 1,900/32 / 1,500/25 / 850/15 | do | 5 / 5 / 90 |
| 15 | Ethanol / Methylstearylamine | 2.5 / 0.2 | 2,2'-dihydroxy-3,3'-di-tert.-5,5'-dimethyl diphenylmethane. | 0.5 | 104 / 82 / 72 | 1,900/30 / 1,450/20 / 700/14 | do | 5 / 5 / 90 |
| 16 | Ethanol / Bis(2-aminoethyl)-amine. | 2.5 / 0.2 | do | 0.5 | 98 / 101 / 100 | 2,100/36 / 2,200/40 / 2,150/35 | do | 5 / 5 / 90 |

The working up process according to the invention also considerably improves hot-air ageing. Table 4 shows the Mooney viscosity data after storage for 7 days in a Greer oven at 70° C. The conventional anti-ager, 2,2-dihydroxy-3,3-di-tert.-butyl-5,5-dimethyl-diphenylmethane, was used in a small quantity (0.2% by weight) in this test in order to show up the effect of bis-(2-aminoethyl)-amine.

TABLE 4

| Example No. | Deactivator | Percent by weight | Stabiliser | Percent by weight | Mooney viscosity. ML-4'/100°C a | b |
|---|---|---|---|---|---|---|
| 17 | Ethanol | 2.5 | 2,2'-dihydroxy-3,3'-tert.-butyl-5,5'-dimethyl-diphenyl-methane. | 0.2 | 93 | 63 |
| 18 | Ethanol / Bis-(2-aminoethyl)-amine | 2.5 / 0.1 | do | 0.2 | 98 | 77 |
| 19 | Ethanol / Bis-(2-aminoethyl)-amine / Methylstearylamine | 2.5 / 0.2 / 0.4 | do | 0.2 | 94 | 80 |

Note.—a=measured after working up; b=after 7 days in a Geer oven at 70° C.

What is claimed is:

1. A process for isolating cis-1,4-polyisoprene from its polymerisation solution in an organic solvent containing organo-metallic mixed catalyst, said process comprising deactivating said catalyst by adding to said solution 0.02 to 1.00% by weight, based on the weight of the polyisoprene, of a primary or secondary polyalkylamine containing up to 6 carbon atoms in said alkyl moieties and 0.05 to 0.8% by weight, based on the weight of said polyisoprene, of an aliphatic secondary monoamine having methyl as one nitrogen substitutent and alkyl containing 9 to 24 carbon atoms as the other nitrogen substitutent and then steam distilling said mixture.

2. The process of claim 1 wherein a lower aliphatic alcohol in an amount of from 0.05 to 5% by weight, based on the weight of the polyisoprene, is added to said solvent solution.

3. The process of claim 1 wherein said primary or secondary polyalkylamine and said aliphatic secondary monamine are added to said solvent solution as a solution in a hydrocarbon solvent.

4. The process of claim 3 wherein said organic solvent of said polyisoprene solution corresponds to the hydrocarbon solvent for said amines.

References Cited

UNITED STATES PATENTS

| 3,008,944 | 11/1961 | Wilson | 260—94.3 |
| 3,135,716 | 6/1964 | Uraneck | 260—45.5 |
| 3,269,997 | 8/1966 | Lyons et al. | 260—94.9 |
| 3,165,503 | 1/1965 | Kahn et al. | 260—94.3 |
| 3,424,736 | 1/1969 | Nudenberg et al. | 260—94.3 |

JOSEPH L. SCHOFER, Primary Examiner

W. F. HAMROCK, Assistant Examiner

U.S. Cl. X.R.

260—85.1